(12) United States Patent
Wilson et al.

(10) Patent No.: US 12,282,918 B2
(45) Date of Patent: Apr. 22, 2025

(54) SYSTEMS, METHODS, AND COMPUTER PROGRAM PRODUCT FOR CONTENT EXCHANGE SERVICES FOR PAYMENT NETWORKS

(71) Applicant: The Clearing House Payments Company L.L.C., New York, NY (US)

(72) Inventors: Tammy Lynn Wilson, Van Alstyne, TX (US); Peter Andrew Davey, Powhatan, VA (US)

(73) Assignee: The Clearing House Payments Company L.L.C., New York, NY (US)

( * ) Notice: Subject to any disclaimer, the term of this patent is extended or adjusted under 35 U.S.C. 154(b) by 5 days.

(21) Appl. No.: 18/185,510

(22) Filed: Mar. 17, 2023

(65) Prior Publication Data

US 2024/0311823 A1 Sep. 19, 2024

(51) Int. Cl.
*G06Q 20/40* (2012.01)
*G06Q 20/38* (2012.01)
*G06Q 20/42* (2012.01)

(52) U.S. Cl.
CPC ......... *G06Q 20/40* (2013.01); *G06Q 20/3821* (2013.01); *G06Q 20/425* (2013.01)

(58) Field of Classification Search
CPC ... G06Q 40/40; G06Q 20/3821; G06Q 20/435
USPC .................................................. 705/35–45
See application file for complete search history.

(56) References Cited

U.S. PATENT DOCUMENTS

| | | | | |
|---|---|---|---|---|
| 7,844,546 B2* | 11/2010 | Fleishman | ............. | G06Q 20/40 705/44 |
| 7,996,290 B2* | 8/2011 | Dweck | ................... | G06Q 40/00 705/35 |
| 2004/0148235 A1* | 7/2004 | Craig | ..................... | G06Q 40/00 705/35 |
| 2005/0234822 A1* | 10/2005 | VanFleet | ................. | G06Q 20/40 705/40 |
| 2007/0067239 A1* | 3/2007 | Dheer | ..................... | G06Q 30/08 705/40 |
| 2008/0065520 A1* | 3/2008 | Hazlehurst | ......... | G06Q 30/0224 705/35 |

* cited by examiner

*Primary Examiner* — Robert R Niquette
(74) *Attorney, Agent, or Firm* — Merchant & Gould P.C.

(57) ABSTRACT

Methods, systems, and computer program products are provided for secure content exchange. A secure content exchange platform includes a content exchanger and exchange gateway interface. The content exchanger stores a content item and generates a globally unique identifier (GUID) associated with the content item. The exchange gateway interface receives a registration request for the content item from a sending financial institution system, submits the content item to the content exchanger, receives the GUID associated with the content item from the content exchanger, returns the GUID to the sending financial institution system as a response to the registration request, receives a retrieval request from a recipient financial institution system, retrieves the GUID from the retrieval request to submit the GUID to the content exchanger, receives the content item from the content exchanger, and returns the content item to the recipient financial institution system as a response to the retrieval request.

22 Claims, 8 Drawing Sheets

SYSTEMS, METHODS, AND COMPUTER PROGRAM PRODUCT FOR CONTENT EXCHANGE SERVICES FOR PAYMENT NETWORKS

BACKGROUND

Field

Example aspects of the present disclosure generally related to electronic transactions, and more particularly related to electronic transactions across payment networks with associated content items.

Related Art

The exchange of information between computing systems operated by different entities is an integral part of modern business transactions. In the context of payment networks, transaction-related information can include documentation related to the ultimate payment network credit or debit transaction communications between such computing systems, such as receipts or remittance documentation. The exchange of transaction-related information between, for example, payor systems and payee systems are predominately facilitated via e-mail and other unsecure channels whereas the credit or debit communications must be kept secure. This poses significant challenges in terms of security and efficiency and can create a disconnect between the transaction-related information, such as invoices and remittance documentation and the associated credit or debit transaction. In turn, this disconnect not only creates inefficiency within receivables and payables processes, but also a poor user experience for all the involved parties.

The technical challenges associated with the exchange of transaction-related information between computing systems operated by different entities involve security, interoperability, data standardization, integration, scalability, and timing of transactions including timing of transaction-related information. Overall, the technical challenges associated with the exchange of transaction-related information between computing systems operated by different entities are significant as the inhibit efficient and secure processing of transactions.

SUMMARY

The foregoing problems with security and connectivity in the current state of payment systems, as well as other limitations are overcome by systems, methods and computer program products for a secure content exchange platform as disclosed herein.

Example aspects of the present disclosure relate to a system for secure content exchange. The system includes a content exchanger configured to store a content item and generate a globally unique identifier (GUID) associated with the content item. The system further includes an exchange gateway interface in communication with the content exchanger and configured to: receive a registration request for the content item from a sending financial institution system; submit the content item to the content exchanger; receive the GUID associated with the content item from the content exchanger; return the GUID to the sending financial institution system as a response to the registration request; receive a retrieval request from a recipient financial institution system; retrieve the GUID from the retrieval request; submit the GUID to the content exchanger; receive the content item from the content exchanger; and return the content item to the recipient financial institution system as a response to the retrieval request.

In one embodiment, the sending financial institution system transmits the GUID in a message. In some implementations, the message is transmitted using a payment network. In another embodiment, the payment network is a real time payment network.

In another embodiment, the exchange gateway interface is further configured to register the content item by validating a first credential associated with the sending financial institution system. In some implementations, the content item originates from a content provider system and the exchange gateway interface is further configured to validate a second credential associated with the content provider system. In other aspects, the exchange gateway interface is further configured to retrieve the content item by validating a third credential associated with the recipient financial institution system. In some further aspects, the message is directed to a content recipient associated with the recipient financial institution system, wherein the exchange gateway interface is further configured to validate a fourth credential associated with the content recipient system.

In another embodiment, the system further includes at least one management portal. In some implementations, the at least one management portal in communication with one or more of a registration application programming interface (API) or a retrieval API. In other aspects, the system further includes a first management portal associated with the sending financial institution system and a second management portal associated with the recipient financial institution system. In another embodiment, the content item is one of a document, a data file, or an image.

Further example aspects of the present disclosure relate to a method for securely exchanging content items via a secure content exchange server. The method includes steps of receiving, from a sending financial institution system, a registration request for a content item; submitting, to a content exchanger, the content item; receiving, from the content exchanger, a globally unique identifier (GUID) associated with the content item; returning the GUID to the sending financial institution system; receiving, from a recipient financial institution system, a retrieval request including the GUID; retrieving, from the message, the GUID; submitting, to the content exchanger, the GUID; receiving, from the content exchanger, the content item; and returning, to the recipient financial institution system, the content item.

In an embodiment, the message is transmitted from the sending financial institution system to the recipient financial institution system via a payment network. In some implementations, the payment network is a real time payment network. In other aspects, the method further includes steps of receiving, from the sending financial institution system, one or more credentials; and verifying the one or more credentials.

In some implementations, the one or more credentials comprise credentials for a content provider system associated with the content item. In further aspects, the one or more credentials comprise credentials for the sending financial institution system. In other embodiments, the sending financial institution system submits the registration request via a registration API.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

Figure 1:
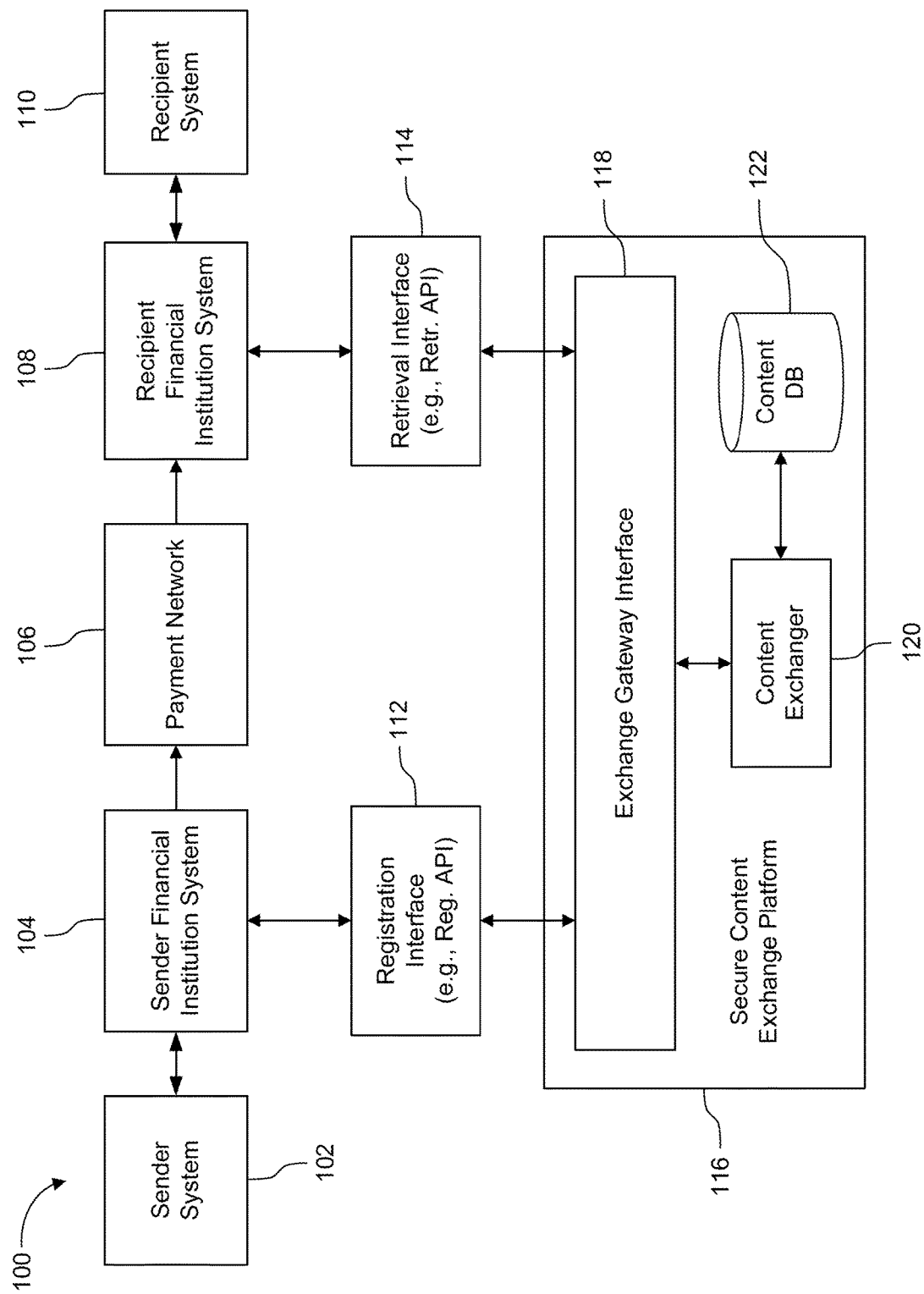
FIG. 1 depicts a system-flow diagram illustrating an architecture for exchanging payment messages with an associated content item, in accordance with an example embodiment.

In the following detailed description, references are made to the accompanying drawings that form a part hereof, and in which are shown by way of illustrations specific embodiments or examples. These aspects may be combined, other aspects may be utilized, and structural changes made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Generally, example aspects of the embodiments described herein provide systems, methods, and computer program products for securely exchanging content items associated with payment messages. More specifically, example aspects of the embodiments described herein integrate a secure content exchange platform for registration and retrieval of electronic documents and other content items of referential material to be transmitted for display from one party to another a part of a payment transaction. Examples of such referential materials include documents itemizing or describing what payment due is for or what accounts are to be reconciled by a payment. Example formats which content items may be prepared or received in include Extensible Markup Language (XML), SWIFT, X12 820, and others. Financial institutions communicate with the platform through cloud-based interfaces, such as application programming interfaces (APIs), on their client's behalf, supporting seamless integration with existing payment systems.

Example aspects of the present disclosure relate to a system for secure content exchange. The system includes a secure content exchange platform including a content exchanger configured to store a content item (e.g., a document, a data file, or an image or other media file) and generate a globally unique identifier (GUID) associated with the content item. The secure content exchange platform further includes an exchange gateway interface in communication with the content exchanger and configured to receive a registration request for the content item from a sending financial institution system and submit the content item to the content exchanger. The exchange gateway interface receives the GUID associated with the content item from the content exchanger and returns the GUID to the sending financial institution system as a response to the registration request. The exchange gateway interface is also configured to receive a retrieval request from a recipient financial institution system and retrieve the GUID from the retrieval request to submit the GUID to the content exchanger. The exchange gateway interface receives the content item from the content exchanger and returns the content item to the recipient financial institution system as a response to the retrieval request.

Implementations of the document exchange platform disclosed herein overcome limitations in existing payment network transactions. The existing capabilities of banks and providers can be extended through use of a common infrastructure and the secure exchange of information between a payor and payee can be supported. Advantages for each participant in payment network transactions are provided by aspects of the present disclosure.

A payee's bank or other financial institution may experience an increase in the value of both retail and commercial products by leveraging a common set of capabilities. By addressing limitations of the present information exchange environment, the payee bank can support a broader market and drive additional volume of client support. A payor's bank or other financial institution may experience similar benefits.

A payee company or individual may themselves experience benefits such as reduced costs associated with invoicing and billing, and streamlining data exchange by direct association of supporting documents with payment request messages. Risk is also reduced by using the secure payment network channel to exchange all payment associated information with payors. Additionally, the presentation of the invoice or bill may be improved over the current capabilities of payment network exchanges. A payor company or individual may experience benefits such as reduced time and effort to receive, review, process, and pay invoices and bills due to streamlining of data exchange with a payee. Risk reduction and improvements in presentation are also advantageous to the payee.

Aspects of the present disclosure provide improved straight-through processing for payors and payees. Aspects of the present disclosure may contribute to the adoption and growth of electronic payment mechanisms through attributes such as enabling the seamless exchange of transaction-related artifacts, such as bills and invoices, between payor and payee; leveraging application programming interfaces (APIs) to support various capabilities within the payment and content exchange ecosystem (e.g., registration, retrieval, etc.); supporting an enhanced customer experience via payment networks; establishing connectivity; and performing certification and a range of other administrative tasks.

FIG. 1 depicts a system-flow diagram illustrating a content exchange system 100 for exchanging payment messages with secure associated content, in accordance with an example embodiment. In some implementations, the content exchange system 100 includes a sender system 102, a sender financial institution system 104, a payment network 106, a recipient financial institution system 108, a recipient system 110, a registration interface 112, a retrieval interface 114, and a secure content exchange platform 116. The secure content exchange platform 116 includes an exchange gateway interface 118, a content exchanger 120, and a content database 122.

Sender system 102 operates to communicate with sender financial institution system 104. In some use cases, sender system 102 is operated by a business or individual that is submitting content to be relayed to another system, such as recipient system 110, in association with a payment message. In some embodiments, the payment message is a request for payment (RfP) message or a payment transfer (credit) message. In one example, the sender system 102 is associated with a supplier. The supplier submits a content item, such as an invoice document, to be transmitted with an RfP message to a recipient system 110 such as one operated by a buyer or other recipient entity.

Sender system 102 interacts, in some embodiments, with a portal associated with sender financial institution system 104, to prepare a payment message with an associated content item. In some embodiments, the portal is a web-based portal or application, or a mobile application. In turn, when a content item is submitted to be registered, business rules are applied to validate the content. Rule may apply to the contents file size, file type, etc. In some implementations, rules are integrated with the portal.

Sender financial institution system 104 operates to communicate with sender system 102, to receive a content item, and with secure content exchange platform 116 to register the content item. In some use cases, sender financial institution system 104 is operated by business or other organization that provides financial services. Sender financial institution system 104 supports sender system 102 with the sending of the content item and the payment message. Sender financial institution system 104 registers a content item provided by sender system 102 with secure content exchange platform 116 using registration interface 112. When a content item is registered, sender financial institution system 104 receives a globally unique identifier (GUID) via registration interface 112. The GUID identifies the registered content item to secure content exchange platform 116.

Sender financial institution system 104 prepares the payment message including the GUID and submits the payment message to payment network 106. Continuing the example from above, sender financial institution system 104 receives the RfP payment message request and the invoice document to include from sender system 102, who is a supplier. Sender financial institution system 104 registers the invoice document with secure content exchange platform 116 via registration interface 112 and receives a GUID associated with the invoice document. Sender financial institution system 104 prepares the RfP message including the GUID, and transmits the RfP message to recipient financial institution system 108 via payment network 106.

Sender financial institution system 104 may communicate with registration interface 112 through a management portal. In some examples, the management portal is configured and maintained by sender financial institution system 104. In some embodiments, sender financial institution system 104 also communicates with retrieval interface 114 and other interfaces and services according to the configuration of the management portal and the requests received from financial institution clients such as sender system 102 and recipient system 110.

Payment network 106 is configured to relay a payment message from sender financial institution system 104 to recipient financial institution system 108.

One such payment network 106 is referred to as a real-time payment network. Real-time payments, as used herein, are payments that are initiated, cleared and settled nearly instantaneously (e.g., within seconds) through the utilization of a payment network. A real-time payment network (also referred to as a real-time payments platform) generally refers to a network through which real-time payments are made. The RTP® network is a real-time payment network in the United States provided by The Clearing House. The RTP® network is accessible to financial institutions that hold DDAs. In the art, a real-time payment message is referred to as an RTP message. RTP in this context should not to be confused with the registered trademark RTP®.

Another type of payment network is the automated clearinghouse (ACH) system, referred to herein simply as the ACH network, is a network through which depository institutions send each other batches of electronic credit and debit transfers. The direct deposit of payroll, social security benefits, and tax refunds are typical examples of ACH credit transfers. The direct debiting of mortgages and utility bills are typical examples of ACH debit transfers. While the ACH network was originally used to process mostly recurring payments, the network is today being used extensively to process one-time debit transfers, such as converted check payments and payments made over the telephone and internet.

The Electronic Payment network (EPN) is an ACH system operated by The Clearing House that operates as a computerized electronic funds transfer system for processing both individual consumer and commercial financial transactions. The EPN and the Federal Reserve System are two national ACH platforms capable of performing ACH transactions.

As an ACH operator, the Reserve Banks (i.e., the regional banks of the Federal Reserve System) receive files of ACH payments from originating depository financial institutions, edit and sort the payments, deliver the payments to receiving depository financial institutions, and settle the payments by crediting and debiting the depository financial institutions' settlement accounts. The Federal Reserve System and EPN rely on each other to process interoperator ACH payments, payments in which the originating depository financial institution (ODFI) and the receiving depository financial institution (RDFI) are served by different operators. These interoperator payments are typically settled by the so-called Reserve Bank Systems.

From a technology perspective, the RTP® network is significantly different from the ACH network. RTP® network payments clear and settle individually in real-time with immediate finality. Same day ACH payments are cleared in batches and finally settle after the payments clear. The RTP® network and ACH network are also built upon different infrastructures having their own protocols. A transaction that cannot be processed in real-time by accessing a demand deposit account over the RTP® network, for example, might be able to be processed over the ACH network as an ACH debit transaction.

One technical limitation of the existing payment networks such as the RTP® network and the ACH network is that they do not seamlessly communicate with each other. Moreover, the same controls that can be performed on the RTP® network cannot be performed on the ACH network. This is because the ACH network does not have immediate access to the same amount of information as the RTP® network. Further, tokens implemented in connection with these payment networks are not currently shared across all the connected entity systems. As such, integrating merchant payment systems, the RTP® network, and the ACH network as one ecosystem, much less doing so in a secure, controlled manner, is not presently possible.

In some embodiments, the payment network 106 is an RTP® network. In some embodiments, payment network 106 is an ACH network.

Payment network 106 routes (e.g., receive and transmit) electronic transactions and various types of messages between financial institutions, such as sender financial institution system 104 and recipient financial institution system 108. Payment network 106 includes one or more computers and/or servers which are configured to handle electronic financial transactions. Payment network 106 includes one or more databases. Although represented as a single network, in some embodiments there are more than one such network. In some embodiments, payment network is a real-time payment network.

Recipient financial institution system 108 operates to communicate with secure content exchange platform 116, to retrieve a content item, and with recipient system 110, to present the content item. In some use cases, recipient financial institution system 108 is operated by business or other organization that provides financial services. Recipient financial institution system 108 supports an individual or business, such as recipient system 110, with receiving the content item and the payment message. Recipient financial institution system 108 retrieves content items from secure content exchange platform 116 via retrieval interface 114 and presents the content item to recipient system 110.

To retrieve a content item, recipient financial institution system 108 receives a payment message via payment network 106 and provides the payment message to recipient system 110. If the payment message has a GUID included, the recipient system 110 may submit a retrieval request to recipient financial institution system 108. Recipient financial institution system 108 receives the retrieval request from recipient system 110, extracts the GUID from the payment message, and submits the retrieval request, including the GUID, to retrieval interface 114. Recipient financial institution system 108 receives the content item from secure content exchange platform 116 via retrieval interface 114, and presents the content item to recipient system 110.

In some implementations, recipient financial institution system 108 communicates with retrieval interface 114 through a management portal. The management portal is configured and maintained by recipient financial institution system 108, in some embodiments. In some embodiments, recipient financial institution system 108 also communicates with registration interface 112 and other interfaces according to the configuration of the management portal and the requests received from financial institution clients such as recipient system 110 and sender system 102. In some examples, recipient financial institution system 108 and sender financial institution system 104 are the same financial institution. In examples where recipient financial institution system 108 and sender financial institution system 104 are a same financial institution, a same management portal may be used to communication with both registration interface 112 and retrieval interface 114. In some examples, one financial institution implements one or more management portals.

Recipient system 110 operates to communicate with recipient financial institution system 108. In some use cases, recipient system 110 is operated by an individual or business that is receiving the content item and the payment message from another system, such as sender system 102. Recipient system 110 receives a payment message from a payment network 106 via recipient financial institution system 108. If the payment message has an associated content item, e.g., includes a GUID, recipient system 110 can request the recipient financial institution system 108 retrieve the content item. Once the recipient financial institution system 108 retrieves the content item from secure content exchange platform 116, recipient system 110 receives the content item from recipient financial institution system 108.

In some embodiments, recipient system 110 views one or both of the payment message and the content item via a portal provided by recipient financial institution system 108. The portal may be a web-based portal or application, or a mobile application, among other possibilities.

Registration interface 112 submits content items provided by sender financial institution system 104 with secure content exchange platform 116. In some embodiments, registration interface 112 also performs checks or verifications of credentials associated with sender financial institution system 104 or sender system 102. In some embodiments, registration interface 112 is configured, such as through implementation of a service level agreement, to execute registration in a predetermined time period. In one example, the time period for registration is four seconds or less. In some embodiments, registration interface 112 is a registration application programming interface (API), such as a cloud-based API. In some examples, registration interface 112 performs content item checks, such as looking at whether a duplicate of an already registered content item is being submitted. In other examples, such duplicate checks are absent or performed within secure content exchange platform 116, such as exchange gateway interface 118.

Retrieval interface 114 retrieves content items from secure content exchange platform 116 in response to a retrieval request from a verified recipient. In some embodiments, retrieval interface 114 also performs checks or verifications of credentials associated with recipient financial institution system 108 or recipient system 110. In some implementations, retrieval interface 114 is configured, such as through implementation of a service level agreement, to execute retrieval in a predetermined time period. In one example, the time period for retrieval is two seconds or less. Retrieval interface 114, in some embodiments, is a retrieval API, such as cloud-based API.

Other interfaces, not shown, may also be integrated and provide additional functionality to support the content exchange process. Additional examples discussed herein include an access interface and an availability interface, but those of skill in the art will understand that any number of services may be integrated based on desired functionality. Similar to registration interface 112 and retrieval interface 114, in some embodiments, additional interfaces are implemented as APIs, such as cloud-based APIs.

An access interface provides security and credential validation for content exchange system 100. In some embodiments, the access interface enables users to request a token that provides the ability to access interface or perform specific API actions (e.g., register a content item, retrieve a content item, update active status or an expiration date for a content item, etc.) during a particular session. For example, a financial institution, acting as either a sender financial institution or a recipient financial institution, receives a token which is presented to other interfaces, such as registration interface 112 or retrieval interface 114, as authorization. The token enables a user to access one or more services or submit requests during a session. In some embodiments, the token is configured to expire after a predetermined period of time or following a predetermined number of requests.

An availability interface provides current status information on a registered document or enables a sender to set a registered document's status as active or inactive, or update its expiration date. In some embodiments, the availability interface is provided by an availability API. In examples, via the availability API, a sender requests to change the status of a content item. A content item's status is active when the content item is presently stored in content database 122 and can be retrieved for recipient system 110 using a GUID associated with the content item. A content item's status may be set to inactive when the content item is removed from content database 122. An inactive status may also indicate generally that the content item cannot be retrieved, even with proper submission of the associated GUID, although the content item is still maintained in content database 122.

A sender, via the availability interface, adjusts an expiration date for the content. In some embodiments, content database 122 provides temporal storage, and a content item stored in content database 122 has an expiration date set by default when the content item is stored in content database 122. The default may be a predetermined number of days, weeks, month, hours, minutes, etc. that the content item will be maintained in content database 122. In some implementations, a sender sets an expiration date other than the default during initial registration of a content item or, via the availability interface, adjusts expiration of the content item to be sooner or later than the default. In some embodiments, the default expiration period represents a maximum amount of time a content item is retained within content database 122, such that a user cannot set the expiration date to be longer than the default date. In one example, the default expiration date is set at 90 days after registration.

Secure content exchange platform 116 provides secure storage and control of content to be associated with a payment message. In some embodiments, secure content exchange platform 116 includes exchange gateway interface 118, content exchanger 120, and content database 122. In embodiments, secure content exchange platform 116 includes more or fewer components, as functionality is combined or distributed. Because secure content exchange platform 116 maintains content items separate from payment network 106, content items can be associated with payment messages without burdening the payment network or exposing the content items through conventional exchange means, e.g., email.

Exchange gateway interface 118 communicates with registration interface 112, retrieval interface 114, and content exchanger 120. Exchange gateway interface 118 regulates traffic and communications into and out of secure content exchange platform 116. In examples, exchange gateway interface 118 performs conformance checks on incoming content items. Conformation checks may verify a content item's size, type, format, etc.

Content exchanger 120 generates a GUID and associates the GUID with a received content item. Content exchanger 120 generates the GUID in response to receiving a content item via exchange gateway interface 118. Content exchanger 120 relays the received content item, in association with the generated GUID, to content database 122 for storage.

Content database 122 stores registered content items for retrieval. Content database 122 provides a central content repository that provides storage of registered documents. In some embodiments, content database 122 is configured for temporal storage. In an example, content database 122 is configured to automatically delete or otherwise remove any content item older than 90 days.

Figure 2:
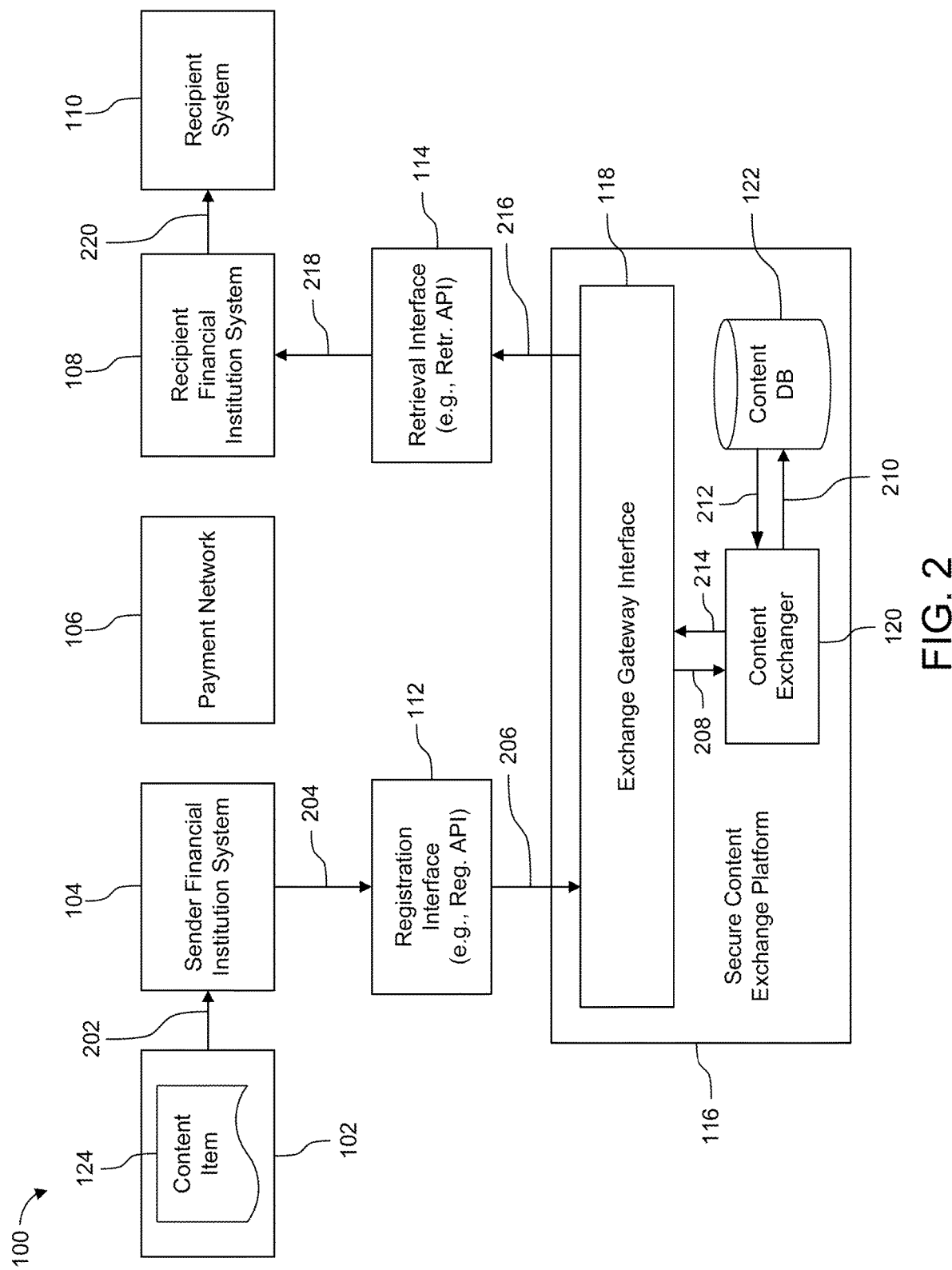
FIG. 2 depicts a system-flow diagram illustrating a flow path of a content item through the content exchange system of FIG. 1, in accordance with an embodiment.

FIG. 2 depicts a system-flow diagram illustrating a flow path of a content item 124 through the content exchange system 100 of FIG. 1, according to an example embodiment. Sender system 102 requests to upload and register a content item 124 to content exchange platform 116. Content item 124 is registered and stored in content database 122, and a corresponding GUID is sent to sender financial institution system 104. Content item 124 may be any one of numerous content types, including but not limited to documents, spreadsheets, media files, data files, images, etc.

FIG. 2 further illustrates how aspects of the present disclosure insulate the content item 124 from payment network 106. While communication from sender system 102 to recipient system 110 relays through payment network 106, content item 124 does not pass through payment network 106. This arrangement limits the burden on payment network 106, without exposing the content item 124 through a less secure transmission, such as email. Aspects of the present disclosure also enable direct association between content item 124 and a payment message, rather than the indirect association available with other transmission means, such as email.

Content item 124 may be any number of content types including, but not limited to, a document, a data file, or an image or other media file. Content item 124 may be submitted or stored as any number of file types based on the configuration of secure content exchange platform 116. In an example, content exchange platform 116 is configured for a single file type, such as portable document format (PDF) or XML, for simplicity and compactness. In other examples, content exchange platform 116 is configured to accept a range of file formats including, as some nonlimiting examples, compressed files, formatted or plain text files, financial record or financial data transfer formats, graphical information organizer files, scientific data files, presentation files, audio files, video files, encryption files, spreadsheet files, and tabulated data files. In some embodiments, content item 124 is subject to size limitations based on the configuration of secure content exchange platform 116. In some embodiments, content exchange platform 116 imposes a file size limit of 1 MB, 2 MB, 3 MB, etc. depending on configuration, capacity, and expected turnover. In some embodiments, files in excess of content exchange platform 116 size limits are rejected or compressed.

As illustrated at 202-210, FIG. 2 illustrates a registration pathway for content item 124. Registration of content item 124 allows secure storage of content item 124 and association with a payment message, through an associated GUID, without compromising the security of the payment message or burdening the payment network.

As illustrated at 202, sender system 102 submits a content item 124 to sender financial institution system 104 and requests to register the content item 124 with secure content exchange platform 116. For example, sender system 102 submits a payment message to sender financial institution system 104 with content item 124 associated, with the request to register the content item 124 with secure content exchange platform 116 included through the association between content item 124 and the payment message.

As illustrated at 204, sender financial institution system 104 relays the content registration request, with content item 124, along to secure content exchange platform 116 via registration interface 112. Registration interface 112 may perform credential validation of sender financial institution system 104. For example, sender financial institution system 104 provides a key or other identifier establishing it as a known financial institution along with the content item and registration request, to demonstrate the request is being submitted from a trustworthy source. In some embodiments, sender financial institution system 104 first communicates with an access interface and receives a session key or token to be presented to registration interface 112, to demonstrate sender financial institution's 104 permissions to make use of content exchange platform 116.

In some embodiments, content item 124 is encrypted at the relay to registration interface 112, illustrated at 204. In some implementations, content item 124 is encrypted by sender financial institution system 104 before being relayed to registration interface 112 using an encrypted communication channel. In other implementations, content item 124 is encrypted by registration interface 112. Content item 124 may remain encrypted until retrieved, remaining encrypted in memory through exchange gateway interface 118 and content exchanger 120, and in storage in content database 122. In some embodiments, content item 124 is encrypted throughout its travel into, through, and out of secure content exchange platform 116, as illustrated from 204 to 218.

As illustrated at 206, content item 124 is relayed to exchange gateway interface 118 of secure content exchange platform 116 to be registered. Exchange gateway interface 118 may perform conformance checks on content item 124 to ensure content item 124 is compatible with content exchange platform 116, such as verifying the content item 124 is a file type and size that is compatible with content database 122.

As illustrated at 208, content exchanger 120 receives content item 124 via exchange gateway interface 118 and registers the content item 124, generating a corresponding GUID. When content exchanger 120 receives content item 124, content exchanger generates a new and unique GUID, which content exchanger 120 associates with content item 124 before relaying the content item 124, with its association to the generated GUID, to content database 122 for storage. As illustrated at 210, content item 124 is stored in content database 122.

Sender system 102 may not be able to register the content item 124 to content exchange platform 116. In such case sender system 102 is alerted to the registration failure. A sender system 102 may not be able to register the content item 124 if, for example, the operation or security requirements of content exchange system 100 are not satisfied. Some nonlimiting examples of requirements that may result in registration failure are failed credentials by sender system 102 or sender financial institution system 104, incorrectly formatted metadata on content item 124, content or document type not being of an accepted type, and content in excess of size limits. In some embodiments, an error message indicating a content item cannot be registered is also generated in response to errors within secure content exchange platform 116, such as a failure of content exchanger 120 to generate a GUID. The error message is provided to sender financial institution system 104 or, in embodiments, to sender system 102. In some implementations, the error message provides guidance on the required content and format or specify accepted content types and file size limits or other corrective measures.

As illustrated at 212-220, FIG. 2 depicts a retrieval pathway of content item 124. Content item 124 is retrieved in response to a validated retrieval request. A retrieval request is initiated by recipient system 110. Recipient system 110 receives a payment message which includes an indication that a content item is associated with the payment message. Recipient system 110 requests to view the content item, such as by selecting a link, button, or menu within or otherwise associated with the payment message display, indicating an associated content item. Recipient financial institution system 108 extracts the associated GUID from the payment message and relays it to retrieval interface 114.

Validation of a retrieval request may be performed by retrieval interface 114 or exchange gateway interface 118, or retrieval interface 114 and exchange gateway interface 118 may perform different aspects of the request validation. In some embodiments, validation of a retrieval request includes checking credentials for recipient financial institution system 108, checking the GUID itself for proper characteristics, or comparing recipient and recipient financial institution identification data with address metadata associated with content item 124.

Retrieval interface 114 may perform credential validation of recipient financial institution system 108, before relaying the retrieval request to exchange gateway interface 118 of secure content exchange platform 116. For example, recipient financial institution system 108 provides a key or other identifier establishing it as a known financial institution along with a GUID and retrieval request, to demonstrate the request is being submitted from a trustworthy source. In examples, recipient financial institution system 108 first communicates with an access interface and receive a session key or token to be presented to retrieval interface 114, to demonstrate recipient financial institution's 108 permissions to make use of content exchange platform 116.

Checking the GUID may include checking the formatting and integrity of the GUID, or checking if the GUID is active. Recipient financial institution system 108, and, in embodiments, recipient system 110, submit credentials, such as a session token, which are checked for validity, currency, or association with the GUID.

As illustrated at 212, content item 124 is retrieved from content database 122 by content exchanger 120. As illustrated at 214, content item 124 is relayed to exchange gateway interface 118 by content exchanger 120. As illustrated at 216, content item 124 is related to retrieval interface 114 by exchange gateway interface 118. As illustrated at 218, content item 124 is relayed to recipient financial institution system 108 by retrieval interface 114. As illustrated at 218, recipient financial institution system 108 receives content item 124.

In some embodiments, content item 124 is decrypted when exiting secure content exchange platform 116, through retrieval interface 114. In some implementations, recipient financial institution system 108 decrypts content item 124 as it is received, as illustrated at 218. In other implementation, retrieval interface 114 decrypts content item 124 while relaying content item 124 to recipient financial institution system 108. As illustrated at 220, recipient financial institution system 108 presents content item 124 to recipient system 110.

Figure 3:
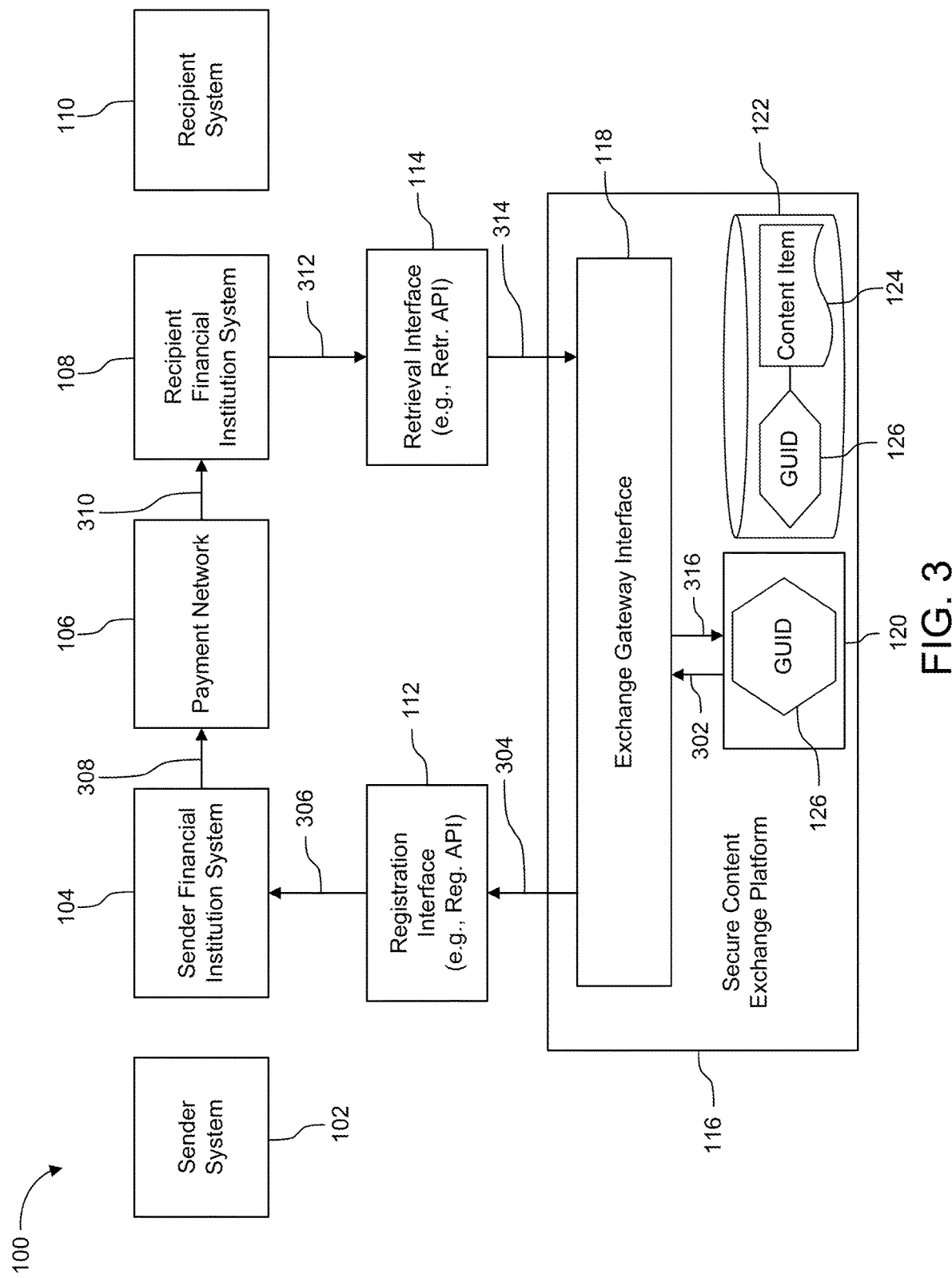
FIG. 3 depicts a system-flow diagram illustrating a flow path of a global unique identifier (GUID) through the content exchange system of FIG. 1, in accordance with an example embodiment.

FIG. 3 depicts a system-flow diagram illustrating a flow path of a GUID 126 through the content exchange system 100, according to an example embodiment. While content item 124 is retained in content database 122 and isolated from payment network 106, GUID 126, being associated with content item 124, provides a secure link between a payment message and content item 124. GUID 126 may be embedded in a payment message, providing a secure link from that payment message to content item 124, while content item 124 is secured in content database 122.

As illustrated at 302-306, FIG. 3 depicts the generation path for GUID 126. GUID 126 is generated in response to registration of a content item, such as content item 124. In some embodiments, GUID 126 is a string of characters, such as alphanumeric characters. The length of the string may be determined according to security considerations and acceptance criteria to be embedded or otherwise include in a payment message. In examples, GUID 126 is between 30 and 60 characters, such as being a 36 character alphanumeric string or a 55 character alphanumeric string.

As illustrated at 302, content exchanger 120 generates GUID 126 corresponding to content item 124 once registered. Content exchanger 120 receives content item 124 from exchange gateway interface 118 and, in response, generates a new GUID 126. GUID 126 is associated with content item 124 and content item 124 is stored in content database 122. In some embodiments, GUID 126 is associated with content item 124 through metadata or through being stored along with content item 124 as a pair.

As illustrated at 304, GUID 126 is relayed to registration interface 112 by exchange gateway interface 118. As illustrated at 306, GUID 126 is relayed to sender financial institution system 104 by registration interface 112.

As illustrated at 308-310, FIG. 3 depicts transmission of GUID 126, as part of a payment message, through payment network 106. GUID 126 provides a secure link between a payment message and a content item, such as content item 124, enabling secure association of referential content items within the existing infrastructure of a payment network.

As illustrated at 308, sender financial institution system 104 includes GUID 126 in a payment message routed to recipient financial institution system 108 via payment network 106. In some embodiments, GUID 126 is embedded in the payment message or inserted in an electronic address field. In embodiments, the electronic address field accepts one or more GUIDs. In embodiments, the payment message and included GUID are addressed to a single recipient, or multiple recipients. The payment message may be any message transmitted over a secure payment network 106, and may not particularly be a message transferring or requesting funds.

As illustrated at 310, recipient financial institution system 108 receives the payment message and extracts GUID 126. Recipient financial institution system 108 presents the payment message to recipient system 110. Recipient system 110 may request to view the associated content item and, in response to recipient's 110 request, recipient financial institution system 108 extracts GUID 126 from the payment message.

As illustrated at 312-316, FIG. 3 depicts a retrieval path for a content item, such as content item 124. Retrieval of a content item is executed by recipient financial institution system 108 in response to a request to review a content item by recipient system 110. Recipient financial institution system 108 uses GUID 126, received within a payment message via payment network 106, to identify the content item to be retrieved.

As illustrated at 312, in response to a retrieval request from recipient system 110, recipient financial institution system 108 submits GUID 126 to retrieval interface 114. As illustrated at 314, retrieval interface 114 relays the retrieval request to exchange gateway interface 118 of secure content exchange platform 116. As illustrated at 316, content exchanger 120 receives GUID 126 and retrieves corresponding content item 124 from content database 122.

Figure 4:
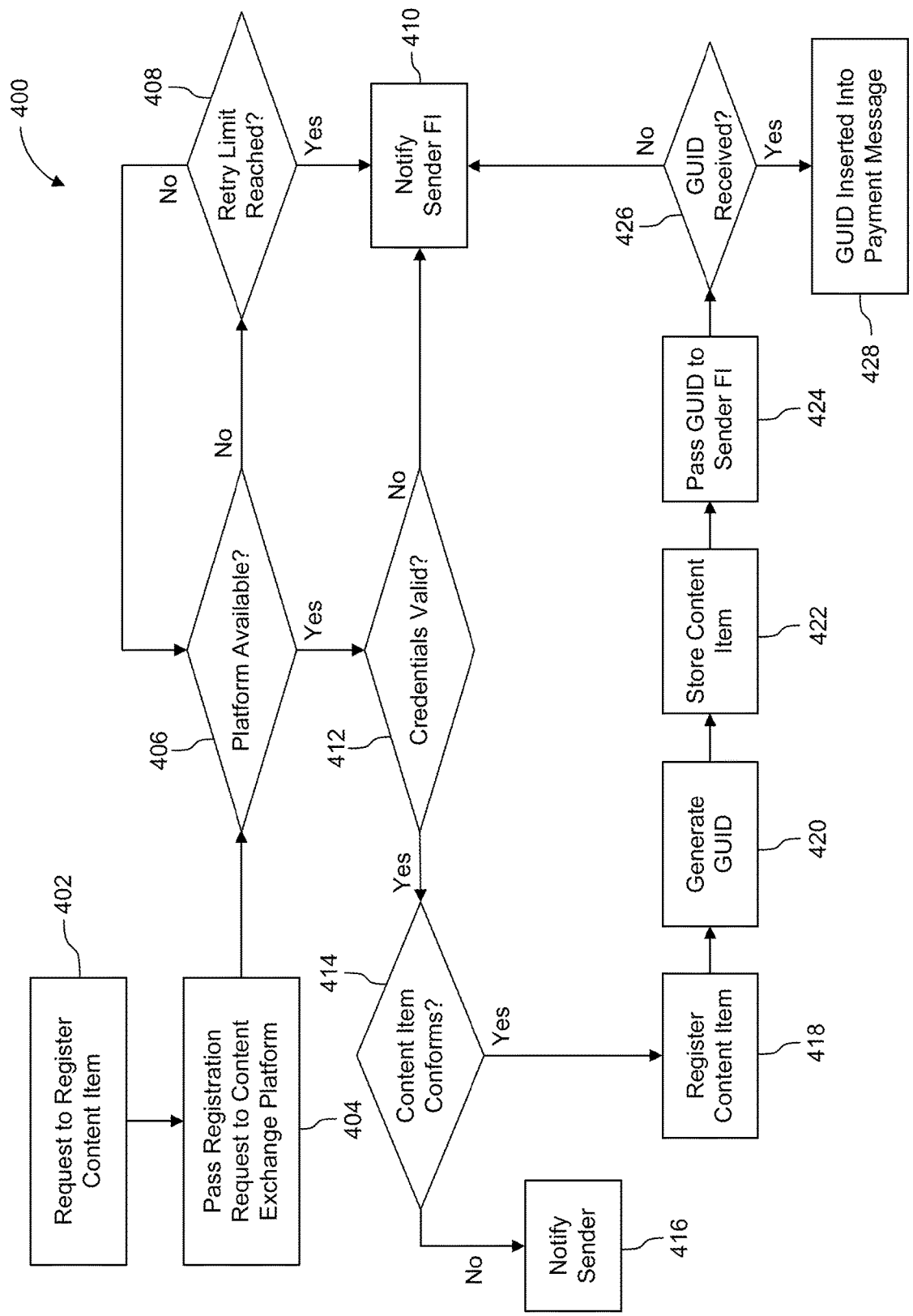
FIG. 4 illustrates a flow chart of a method for registration of a content item, in accordance with an example embodiment.

FIG. 4 illustrates a flow chart of a method 400 for content registration of a content item, according to an example embodiment. Registration of a content item is the process by which a content item, submitted by a sender, is associated and stored with a GUID within the secure content exchange platform. Example exceptions which may prevent a content item from being registered include failed credentials, incorrectly formatted metadata, or an unaccepted content or file type.

At step 402, a sender requests to register a content item. The sender generally directs the request to register the content item to their sender financial institution. In some embodiments, the registration request is included with a request to transmit a payment message. In embodiments, the process or portal used by the sender to submit the content item and registration request includes credentialing or verification of the sender or the content item. While the present example presents an example registration of a single content item, in embodiments multiple content items are submitted and registered together.

At step 404, the sender financial institution relays the registration request to the content exchange platform. The registration request is relayed to the content exchange platform via a registration interface, such as a registration API. In embodiments, relaying the registration request to the content exchange platform includes credentialing or validation of the sender financial institution or the content item. Credentialing of the sender financial institution may be performed by a dedicated access interface, such as an access API.

The access API is configured to provide a participating financial institution an access token to interact with content exchange services or APIs. In examples, access tokens are active only for a given session. In some embodiments, the token is configured to maintain a session for a predetermined period of time, or to support a specific request or number of requests.

At step 406, a determination is made whether or not the platform is available. If no at step 406, and the platform is not available, a retry limit is checked at step 408. If no at step 408, and the retry limit has not been reached, a retry is performed and the availability of the platform is checked again at step 406. If yes at step 408, and the retry limit has been reached, the platform is determined to be unavailable, at step 410. The sender financial institution will receive a notification that the content exchange platform is unavailable and may initiate troubleshooting.

If yes at step 406, and the platform is available, the sender financial institution's credentials are validated, at step 412. If no at step 412, and the sender financial institution's credentials are not validated, the sender financial institution is notified at step 410. Failed credentials are one potential cause of registration failure. To ensure security of stored content items, a financial institution must establish their credentials before relaying content items into, or receiving content items out of, the secure content exchange platform. The sender may be expected to reinitiate the registration request. The sender financial institution may be expected to inform the sender that the registration request may need to be reinitiated. If additional technical support is necessary, such as to update credentials, in some embodiments, the sender financial institution is the party to communicate with technical support associated with the content exchange platform.

If yes at step 412, and the sender financial institution's credentials are validated, the content item itself is checked for conformance, at step 414. Conformance checks may verify, for example, a content item's metadata formatting, the content type, and the content item size. If no at step 414, and the content item fails the conformance checks, the sender may be notified, at step 416. In some embodiments, conformance checks are applied to content items being submitted to the content exchange platform to ensure received items comply with the necessary parameters to allow registration. Conformance checks are performed, by way of example, by an exchange gateway interface of the secure content exchange platform, such as exchange gateway interface 118 of FIG. 1.

Examples of conformance failures that may preclude a content item from being registered with the content exchange platform include content types that the platform is not configured to accept, file types the platform is not configured to accept, and content items with incorrectly formatted metadata. For example, for a content item that cannot be registered due to its metadata being formatted incorrectly, the sender may be expected to review metadata associated with the registration request to ensure it is correct or update the content type to an accepted format. In some embodiments, the sender financial institution is expected to add or adjust business rules restricting the sender from inputting or uploading incorrect metadata or content types that are not accepted. The sender financial institution, in some implementations, is also expected to inform the sender that the content type is not accepted and provide additional guidance on accepted formats (e.g., PDF, XML, etc.).

Another example of conformance failure that may prevent registration is content items or files that exceed size limits of the content exchange platform. In some embodiments, the sender is expected to update the file size of the content to an acceptable range. In an example, the acceptable range is less than 3 MB. The sender financial institution may be expected to inform the sender that their content cannot be registers because it exceeds size limits and to implement or update business rules to restrict senders from uploading content files in excess of content size limits.

If yes at step 414, and the content item relays the conformance checks, the content item is registered with the content exchange platform, at step 418. At step 420, a GUID is generated. At step 422, the content item is stored in the content database. At step 424, the GUID is relayed to the sender FI.

At step 426, a check is performed to verify the GUID has been received by the sender FI. If no at step 426, and the GUID was not received, the sender FI is notified, at step 410. Another example cause of registration failure is if GUID generation is unsuccessful. In this example, the registration process gets as far as the content item being received by the content exchange platform, but an error prevents the GUID from generating correctly, proper association of the content item and the GUID, or proper storage of the content item in association with the GUID. In some embodiments, the sender is expected to review the content item and the registration request to ensure there are no errors. The sender financial institution informs the sender the content item failed to upload to the content exchange platform and may coordinate with technical services for the content exchange platform for troubleshooting.

If yes at step 426, and the sender financial institution successfully receives the GUID, the GUID is inserted into the payment message, at step 428. The sender financial institution includes the GUID in a payment message routed to the recipient financial institution via a payment network. In some embodiments, the payment message is an Extensible Markup Language (XML) message such as International Organization for Standardization (ISO) 20022 defined messages (e.g., pain.013 message, pacs.008 message, etc.). The payment message may be requesting payment, e.g., an RfP, or initiation of a payment, e.g., a payment credit message.

The sender financial institution then transmits a payment message including the GUID to the appropriate recipient financial institution via a payment network. In some embodiments, the payment network is a real-time payment network. The recipient financial institution receives the payment message and presents the payment message to the recipient. The recipient may verify the details of the payment message, such as the sender, a bill summary, an amount due, a due date, an account number, etc.

Method 400 presents an example where the sender makes a single request to the sender financial institution to both prepare the payment message and register the content item. This may be preferred in some instances as it minimizes relaying of the GUID and provides greater streamlining from the client's perspective. However, other embodiments methods are contemplated where, for example, a sender first requests registration of the content item and, in a separate request, requests a payment message with the GUID associated with the content item included. This may be preferred in some instances as providing greater flexibility to the sender to associate a particular content item with more than one payment message.

Figure 5:
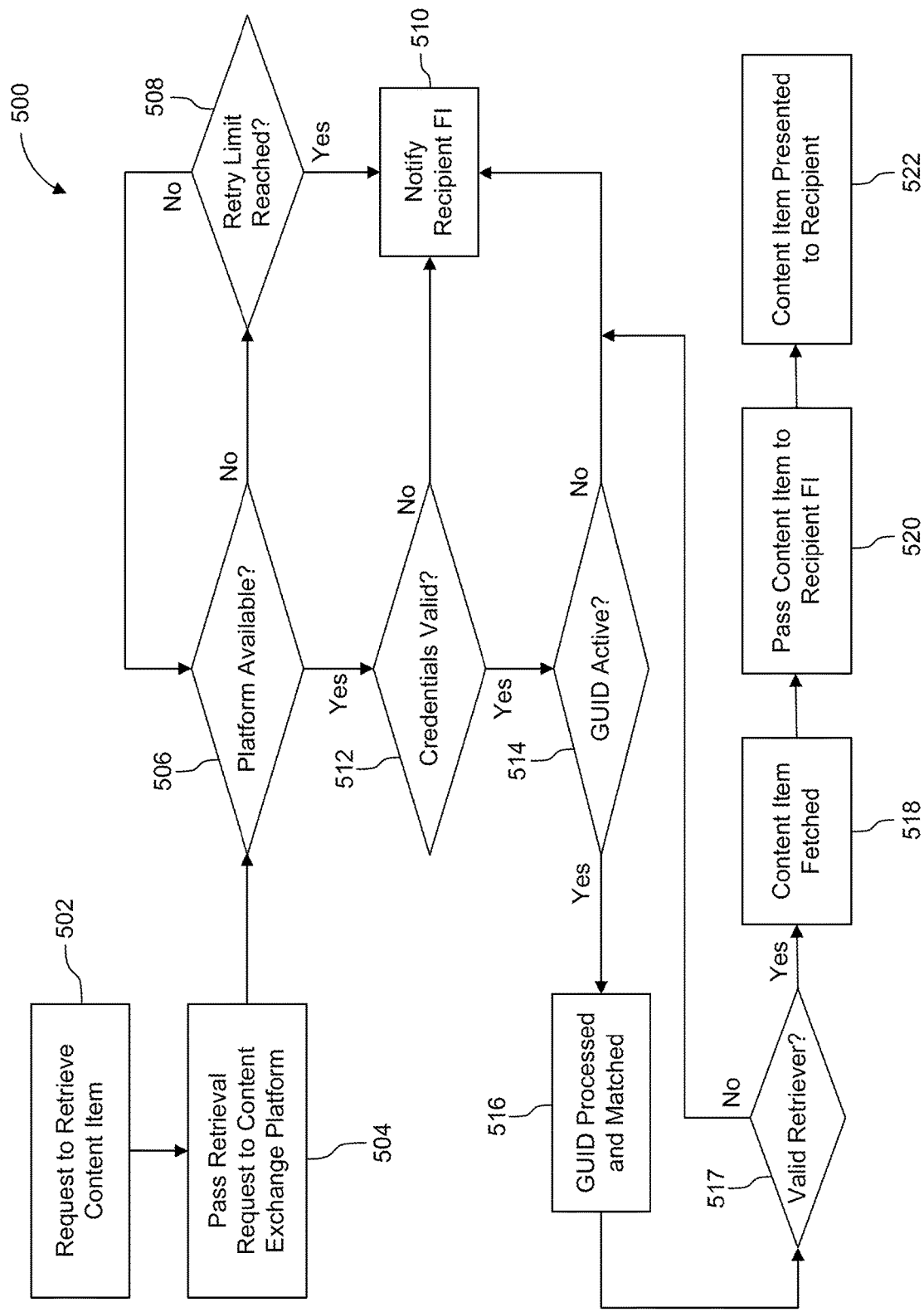
FIG. 5 illustrates a flow chart of a method for retrieval of a content item, in accordance with an example embodiment.

FIG. 5 illustrates a flow chart of a method 500 for content retrieval, according to an example embodiment. A recipient financial institution communicates with a secure content exchange platform to retrieve a content item associated with a GUID extracted from a payment message. The recipient financial institution communicates with the content exchange platform on behalf of the recipient. The recipient financial institution provides communications to the recipient on behalf of the secure content exchange platform, for example if an error occurs or the content item is not able to be retrieved for another reason. A recipient may be unable to retrieve a content item if, for example, there is a problem with the recipient's or the recipient financial institution's credentials or if the submitted GUID is not active. In some embodiments, a content item can be retrieved any number of times as long as the GUID remains active and the temporal storage of the content item within the content database has not expired. In embodiments, registration of a content item indicates a predetermined number of times a content item is able to be retrieved.

At step 502, a recipient requests that a content item, associated with a payment message received by the recipient, be retrieved. For example, the recipient clicks or otherwise selects a link, button, or menu appearing on or with the payment message that indicates additional content is associated with the payment message. At step 504, a recipient financial institution, supporting the recipient, relays the recipients request to the secure content exchange platform. The message may be relayed via a retrieval interface.

At step 506, a determination is made whether the secure content exchange platform is available. If no at step 506, and the content exchange platform is not available, a determination is made if a retry limit has been reached, at step 508.

If no at step 508, and the retry limit has not been reached, another attempt to reach the content exchange platform is made, at step 506. If yes at step 508, and the retry limit has been reached, the recipient financial institution is notified, at step 510. If the content exchange platform is down or otherwise unavailable for some time, the recipient financial institution may wait a period of time and try again or reach out to technical support.

If yes at step 506, and the content exchange platform is available, the recipient financial institutions credentials are validated at step 512. If no at step 512, and the recipient financial institution's credentials cannot be validated, the recipient financial institution is notified, at step 510. If yes at step 512, and the recipient financial institution's credentials are validated, a determination is made whether the GUID is active, at step 514.

If no at step 514, and the GUID is not active, the recipient financial institution is notified, at step 510. A GUID may be deactivated if, for example, the sender removes the content item from the content exchange platform. In some instances, a GUID is deactivated by a sender updating a content item on the content exchange platform. If yes at step 514, and the GUID is active, the GUID is processed and matched to a content item, at step 516.

The content item matched to the GUID, in some embodiments, includes metadata defined by the sender identifying the intended recipient financial institution system or recipient system. The recipient financial institution system from which the retrieval request is received is compared to the recipient financial institution system identified in the metadata, and a determination is made whether the requesting recipient financial institution system matched the metadata identified recipient financial institution system, at step 517.

If no at step 517, and the determination is made that the requesting recipient financial institution does not match the metadata identified recipient financial institution, the requesting recipient financial institution is notified, at step 510. If yes at step 517, and the determination is made that the requesting recipient financial institution does match the metadata identified recipient financial institution, the content item associated with the GUID is fetched, at step 518. At step 520, the content item is relayed to the recipient financial institution. At step 522, the content item is presented to the recipient.

Figure 6:
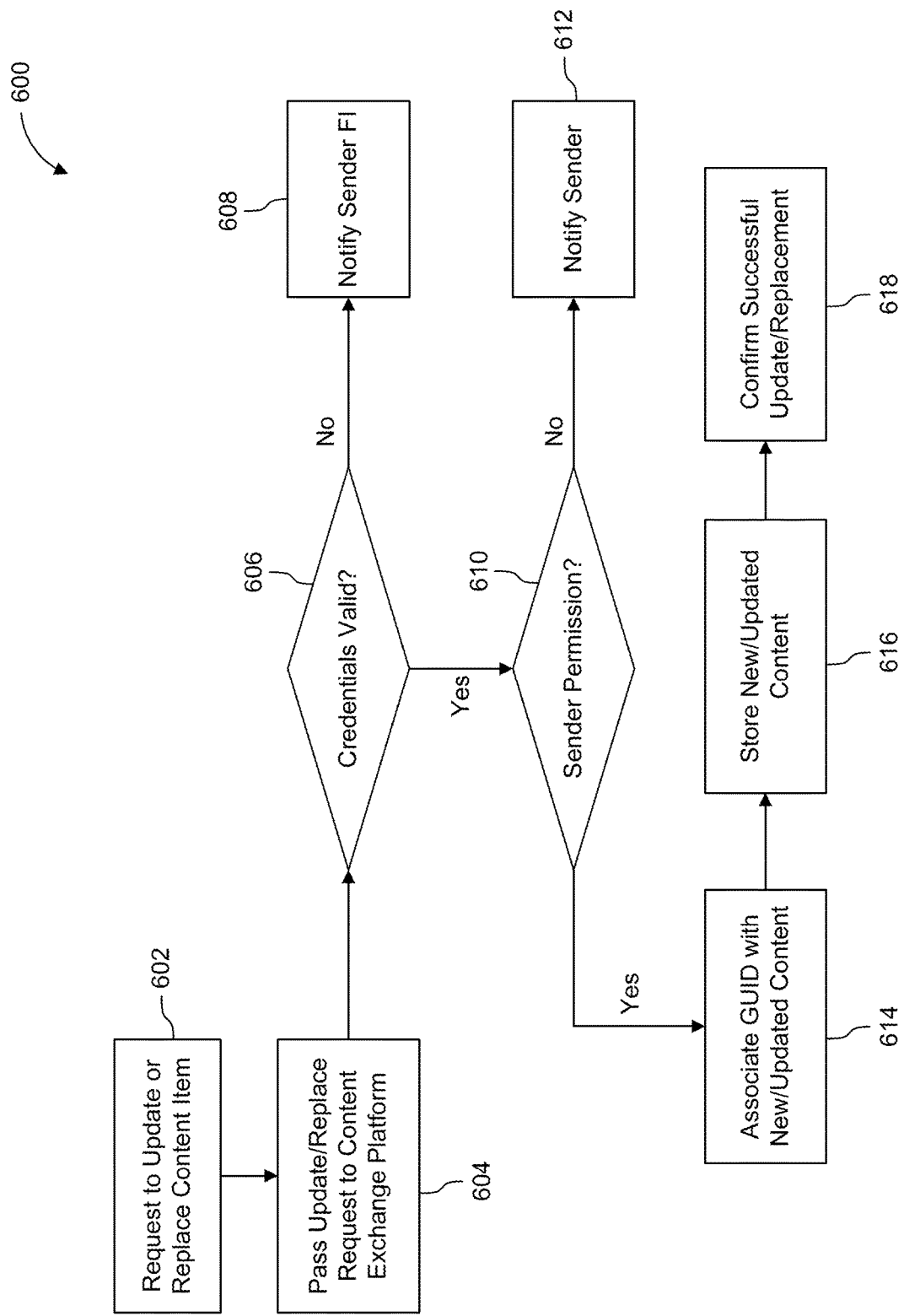
FIG. 6 illustrates a flow chart of a method for updating a registered content item, in accordance with an example embodiment.

FIG. 6 illustrates a flow chart of a method 600 for updating a registered content item, according to an example embodiment. A sender requests to update or replace a content item associated with a particular GUID. The original GUID may be maintained and linked to a new or updated content item. In some embodiments, the original content item is no longer be available to the recipient following the change.

At step 602, a sender requests to update or replace a registered content item. In embodiments, the sender requests to remove a registered content item from the content exchange platform without replacing it. At step 604, the sender financial institution relays the update request to the content exchange platform.

At step 606, the sender financial institutions credentials are validated. If no at step 606, and the sender financial institutions credentials are not validated, the sender financial institution is notified, at step 608. If yes at step 606, and the sender financial institutions credentials are validated, the sender's permissions are verified, at step 610. Verifying the sender's permissions may also include performing conformance checks on the new or updated content item or comparing a sender's identification with metadata identifying the sender associated with the submission of the original content item.

If no at step 610, and the sender's permissions are not verified, the sender is notified, at step 612. If yes at step 610, and the sender's permission are verified, the new or updated content item is associated with the original GUID, at step 614. At step 616, the new or updated content item is stored. In some embodiments, the original content item is deleted or otherwise removed from the content database.

At step 618, confirmation of successful updating or replacement of the content item is sent to the sender financial institution to relay to the sender. If, instead, the content item cannot be updated or replaced due to an error, an update failure notification may instead be sent.

Figure 7:
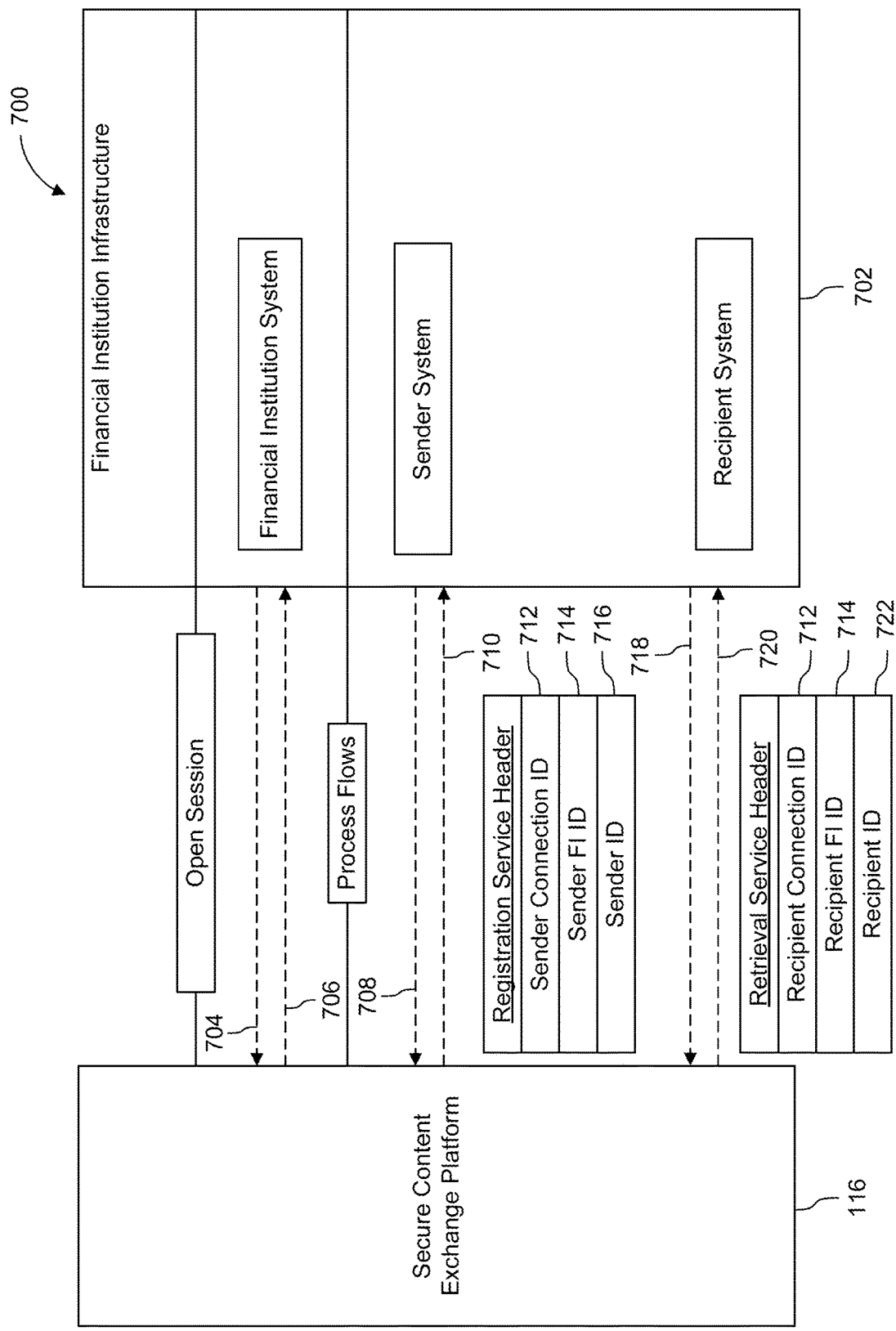
FIG. 7 illustrates a communication sequence between a financial institution infrastructure and a secure content exchange platform, in accordance with an example embodiment.

FIG. 7 illustrates an example communication sequence 700 between a financial institution infrastructure 702 and secure content exchange platform 116. The financial institution infrastructure 702 may be a sender financial institution, a recipient financial institution, or both depending on the requests received from clients.

The financial institution operating the financial institution infrastructure 702 initiates a session by requesting a token 704, such as through an access interface. Once the financial institution infrastructure 702 receives the token 706, the session is opened and remains open as long as the token is active. In some embodiments, the token is configured to remain active for a predetermined period of time, to support a predetermined number of requests, to support a particular request, until an error is thrown, or to be deactivated by request from the financial institution infrastructure 702.

Once the session is open, financial institution infrastructure 702 may execute one or more process flow in communication with secure content exchange platform 116. For example, a registration request 708 is sent on behalf of a sender, and a registration notification and GUID 710 received in return. In some embodiments, the registration request includes a header with one or more credentials or other metadata elements. For example, a registration request header includes a session token 712, an identifier 714 associated with the financial institution infrastructure 702, and, in embodiments, an identifier 716 associated with the sender. In examples, the registration request header includes additional metadata, such as content type, format, and size. Additional metadata, such as an address identifier associated with a recipient or an address identifier associated with a recipient financial institution is included in some embodiments.

Financial institution infrastructure 702 may be configured to communicate with both registration and retrieval interfaces. In some embodiments, the same financial institution infrastructure 702 submits, on behalf of a recipient, a retrieval request 718 and receives a content item 720 in return. In an example, the content item registered with process flows including registration request 708 and GUID 710 are the same content item retrieved with process flows including retrieval request 718 and content item 720. Retrieval request 718 includes a header with one or more credentials or other metadata elements, such as session token 712, an identifier 714 associated with the financial institution infrastructure 702, and, in embodiments, an identifier 722 associated with the recipient. In this example, session token 712 is the same because it is a same session from view of financial institution infrastructure 702 and a same identifier 714 because it is the same financial institution infrastructure 702, but in embodiments different session tokens and financial institution infrastructures, and associated identifiers, are involved.

Communication sequence 700 is applicable, in embodiments, to registration, retrieval, or update processes, and include communication with other services such as access interfaces and availability interfaces. For example, similar process flows are used by a financial institution using an availability interface to determine a status or history of a registered content item.

Figure 8:
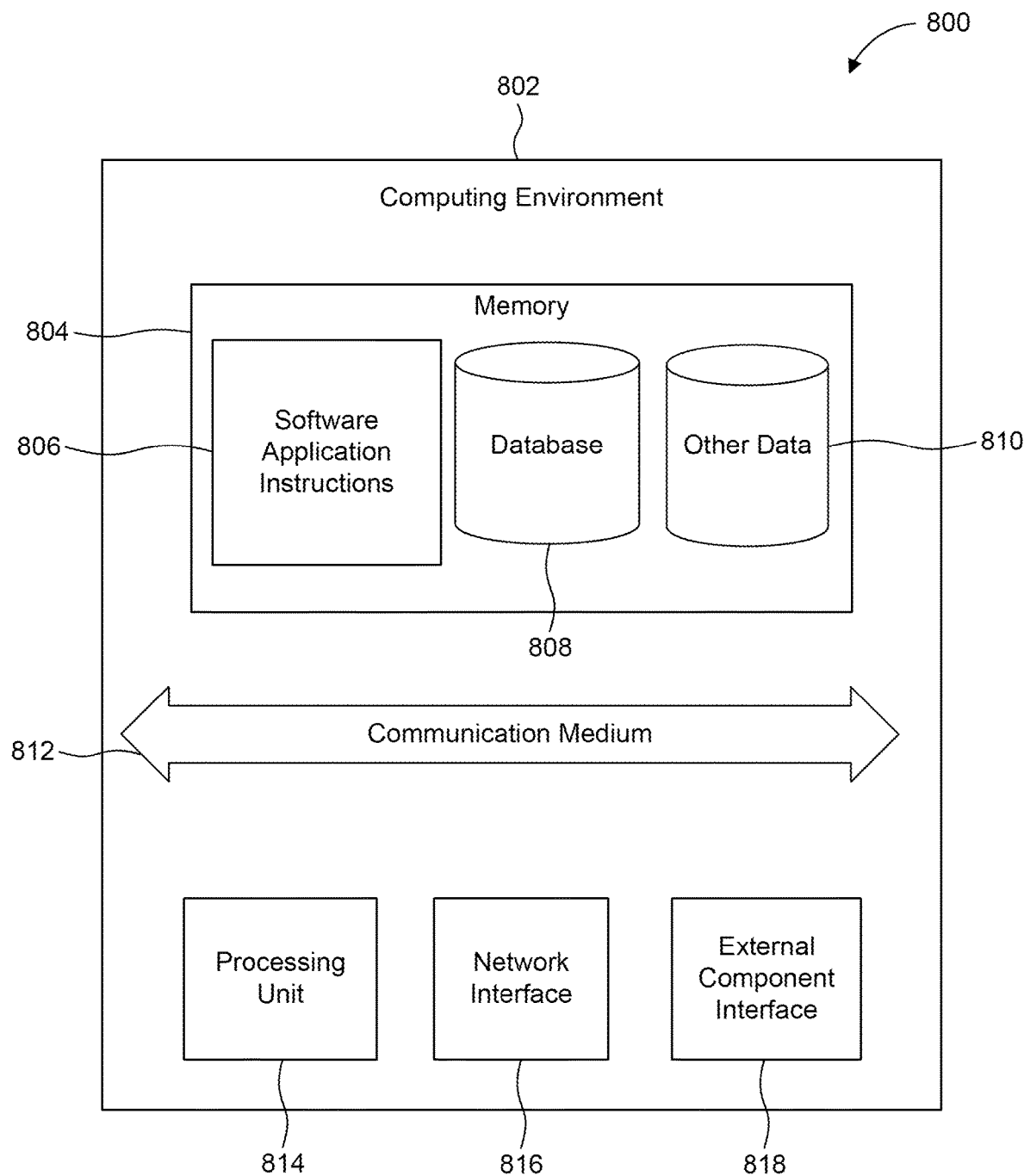
FIG. 8 illustrates a block diagram of a virtual or physical computing system, in accordance with an example embodiment.

FIG. 8 illustrates an example block diagram of a computing system 800. Computing system 800 may be virtual or physical. One or more aspects of the computing system 800 can be used to implement the systems and methods described above in conjunction with FIGS. 1-7, including sender system 102, sender financial institution system 104, payment network 106 infrastructure, recipient financial institution system 108, recipient system 110, registration interface 112, retrieval interface 114, and secure content exchange platform 116, including exchange gateway interface 118 and content exchanger 120.

In an example, the computing system 800 can include a computing environment 802. The computing environment 802 can be a physical computing environment, a virtualized computing environment, or a combination thereof. The computing environment 802 can include memory 804, a communication medium 812, one or more processing units 814, a network interface 816, and an external component interface 818.

The memory 804 can include a computer readable storage medium. The computer storage medium can be a device or article of manufacture that stores data and/or computer-executable instructions. The memory 804 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-crasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 804 can store various types of data and software. For example, as illustrated, the memory 804 includes software application instructions 806, one or more databases 808, as well as other data 810.

In addition, the software application instructions 806 can be included in non-transitory computer-readable medium having stored thereon one or more sequences of instructions, which when executed by one or more processors, cause the one or more processors to perform methods or implement systems described above in conjunction with FIGS. 1-7.

The communication medium 812 can facilitate communication among the components of the computing environment 802. In an example, the communication medium 812 can facilitate communication among the memory 804, the one or more processing units 814, the network interface 816, and the external component interface 818. The communication medium 812 can be implemented in a variety of ways, including but not limited to a peripheral component interconnect (PCI) bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 814 can include physical or virtual units that selectively execute software instructions, such as the software application instructions 806. In an example, the one or more processing units 814 can be physical products comprising one or more integrated circuits. The one or more processing units 814 can be implemented as one or more processing cores. In another example, one or more processing units 814 are implemented as one or more separate microprocessors. In yet another example embodiment, the one or more processing units 814 can include an application-specific integrated circuit (ASIC) that provides specific functionality. In yet another example, the one or more processing units 814 provide specific functionality by using an ASIC and by executing computer-executable instructions.

The network interface 816 enables the computing environment 802 to send and receive data from a communication network. The network interface 816 can be implemented as an Ethernet interface, a token-ring network interface, a fiber optic network interface, a wireless network interface (e.g., Wi-Fi), or another type of network interface.

The external component interface 818 enables the computing environment 802 to communicate with external devices. For example, the external component interface 818 can be a USB interface, Thunderbolt interface, a Lightning interface, a serial port interface, a parallel port interface, a PS/2 interface, or another type of interface that enables the computing environment 802 to communicate with external devices. In various embodiments, the external component interface 818 enables the computing environment 802 to communicate with various external components, such as external storage devices, input devices, speakers, modems, media player docks, other computing devices, scanners, digital cameras, and fingerprint readers.

Although illustrated as being components of a single computing environment 802, the components of the computing environment 802 can be spread across multiple computing environments 802. For example, one or more of instructions or data stored on the memory 804 may be stored partially or entirely in a separate computing environment 802 that is accessed over a network.

Depending on the size and scale of the computing environment 802, it may be advantageous to include one or more load balancers to balance traffic across multiple physical or virtual machine nodes.

Aspects of the computing system 800 and the computing environment 802 can be protected using a robust security model. In an example, users may be made to sign into the system using a directory service, such as ACTIVE DIRECTORY by MICROSOFT CORPORATION of Redmond, Washington. Connection and credential information can be externalized from jobs using an application programming interface. Credentials can be stored in an encrypted repository in a secured operational data store database space. Privileges can be assigned based on a collaboration team and mapped to a Lightweight Directory Access Protocol (LDAP) Group membership. A self-service security model can be used to allow owners to assign other's permissions on their objects (e.g., actions).

Each node may be configured to be capable of running the entirety of the computing system 800, such that portal can run and schedule jobs and serve the portal user interface as long as a single node remains functional. The computing environment 802 may include monitoring technology to determine when a node is not functioning so an appropriate action can be taken.

In addition, it should be understood that FIGS. 1-8 are presented for example purposes only. The architecture of the example embodiments presented herein is sufficiently flexible and configurable, such that it may be utilized (and navigated) in ways other than that shown in the accompanying figures.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A system for secure content exchange, comprising:
   a content exchanger configured to:
      store a content item;
      generate a globally unique identifier (GUID) associated with the content item, wherein the GUID operates as a secure link between the content item and a message; and
   an exchange gateway interface in communication with the content exchanger and configured to:
      receive a registration request for the content item from a sending financial institution system;
      submit the content item to the content exchanger;
      receive the GUID associated with the content item from the content exchanger;
      return the GUID to the sending financial institution system as a response to the registration request;
      receive a retrieval request from a recipient financial institution system that includes the GUID as the secure link to the content item;
      retrieve the GUID from the retrieval request;
      submit the GUID to the content exchanger;
      receive the content item from the content exchanger; and
      return the content item to the recipient financial institution system as a response to the retrieval request.

2. The system of claim 1, wherein the sending financial institution system transmits the GUID in the message.

3. The system of claim 2, wherein the message is transmitted using a payment network.

4. The system of claim 3, wherein the payment network is a real time payment network.

5. The system of claim 1, wherein the exchange gateway interface is further configured to register the content item by validating a first credential associated with the sending financial institution system.

6. The system of claim 5, wherein the content item originates from a content provider system and the exchange gateway interface is further configured to validate a second credential associated with the content provider system.

7. The system of claim 1, wherein the exchange gateway interface is further configured to retrieve the content item by validating a third credential associated with the recipient financial institution system.

8. The system of claim 7, wherein the message is directed to a content recipient associated with the recipient financial institution system, wherein the exchange gateway interface is further configured to validate a fourth credential associated with the content recipient system.

9. The system of claim 1, further comprising at least one management portal.

10. The system of claim 9, wherein the at least one management portal is in communication with one or more of a registration application programming interface (API) or a retrieval API.

11. The system of claim 9, further comprising a first management portal associated with the sending financial institution system and a second management portal associated with the recipient financial institution system.

12. The system of claim 1, wherein the content item is one of a document, a data file, or an image.

13. A method for securely exchanging content items via a secure content exchange server, comprising:
   receiving, from a sending financial institution system, a registration request for a content item;
   submitting, to a content exchanger, the content item;
   receiving, from the content exchanger, a globally unique identifier (GUID) associated with the content item, wherein the GUID operates as a secure link between the content item and a message;
   returning the GUID to the sending financial institution system;
   receiving, from a recipient financial institution system, a retrieval request including the GUID as the secure link to the content item;
   retrieving, from the message, the GUID;
   submitting, to the content exchanger, the GUID;
   receiving, from the content exchanger, the content item; and
   returning, to the recipient financial institution system, the content item.

14. The method of claim 13, wherein the message is transmitted from the sending financial institution system to the recipient financial institution system via a payment network.

15. The method of claim 14, wherein the payment network is a real time payment network.

16. The method of claim 13, further comprising:
   receiving, from the sending financial institution system, one or more credentials; and
   verifying the one or more credentials.

17. The method of claim 16, wherein the one or more credentials comprise credentials for a content provider system associated with the content item.

18. The method of claim 16, wherein the one or more credentials comprise credentials for the sending financial institution system.

19. The method of claim 13, wherein the sending financial institution system submits the registration request via a registration API.

20. The method of claim 19, further comprising a management portal associated with the sending financial institution system, the management portal in communication with the registration API.

21. The method of claim 13, further comprising:
   receiving, from the sending financial institution system, a request to replace the content item with a second content item;
   submitting, to the content exchanger, the request to the replace the content item with the second content item;
   submitting, to the content exchanger, the second content item;
   receiving, from the secure exchange server, confirmation that the GUID is associated with the second content item; and
   returning, the to the sending financial institution system, the confirmation that the GUID is now associated with the second content item.

22. The method of claim 13, wherein the message is a payment message and the GUID is retrieved from a payment message by the recipient financial institution and inserted into the retrieval request.

\* \* \* \* \*